(12) United States Patent
Birk et al.

(10) Patent No.: US 6,543,381 B1
(45) Date of Patent: Apr. 8, 2003

(54) METHOD AND DEVICE FOR CONTROLLING ANIMAL FEEDING WHEN MILKING DAIRY ANIMALS

(75) Inventors: Uzi Birk, Huddinge (SE); Henrik Norberg, Tumba (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 09/786,396

(22) PCT Filed: Sep. 3, 1999

(86) PCT No.: PCT/SE99/01531
§ 371 (c)(1),
(2), (4) Date: Apr. 26, 2001

(87) PCT Pub. No.: WO00/13499
PCT Pub. Date: Mar. 16, 2000

(30) Foreign Application Priority Data

Sep. 4, 1998  (SE) ............................................... 9803010

(51) Int. Cl.⁷ ................................................. A01J 1/12
(52) U.S. Cl. ..................................... 119/14.08; 119/840
(58) Field of Search ........................... 119/14.08, 14.01, 119/14.02, 14.03, 51.02, 840

(56) References Cited

U.S. PATENT DOCUMENTS

| | | | | |
|---|---|---|---|---|
| 5,771,837 A | * | 6/1998 | van der Lely | 119/14.02 |
| 5,778,820 A | * | 7/1998 | van der Lely et al. | 119/14.02 |
| 5,791,284 A | * | 8/1998 | van der Lely | 119/14.02 |
| 6,019,061 A | * | 2/2000 | Schulte | 119/14.03 |
| 6,263,832 B1 | * | 7/2001 | van den Berg | 119/14.08 |

FOREIGN PATENT DOCUMENTS

SE   WO 9619917   * 7/1996

* cited by examiner

Primary Examiner—Charles T. Jordan
Assistant Examiner—Judith A. Nelson
(74) Attorney, Agent, or Firm—Young & Thompson

(57) ABSTRACT

The present invention relates to a device and method for the milking of dairy animals (9), comprising individual identifiers (11) attachable to each individual diary animal (9); simple feeding station (3'-3""), provided with food dispenser (4) for dispensing fodder and sensor (15) for sensing the individual identifiers (11); combined feeding and milking stations (5', 5"), provided with food dispensers (6) for dispensing fodder, milking apparatus (7) for milking animals (9) and sensors (15) for sensing the individual identifiers (11); and control device (8, 19) for controlling the simple feeding stations (3', 3"") and combined feeding and milking stations (5', 5"), wherein the control device (8, 19) comprises determining apparatus (19) for determining a time for the next milking of said individual animal (9); and output apparatus (21) for commanding the single feeding stations (3',3"") to stop dispensing food to the individual animal (9) if the actual time is after the time for the next milking of the animal (9).

12 Claims, 1 Drawing Sheet

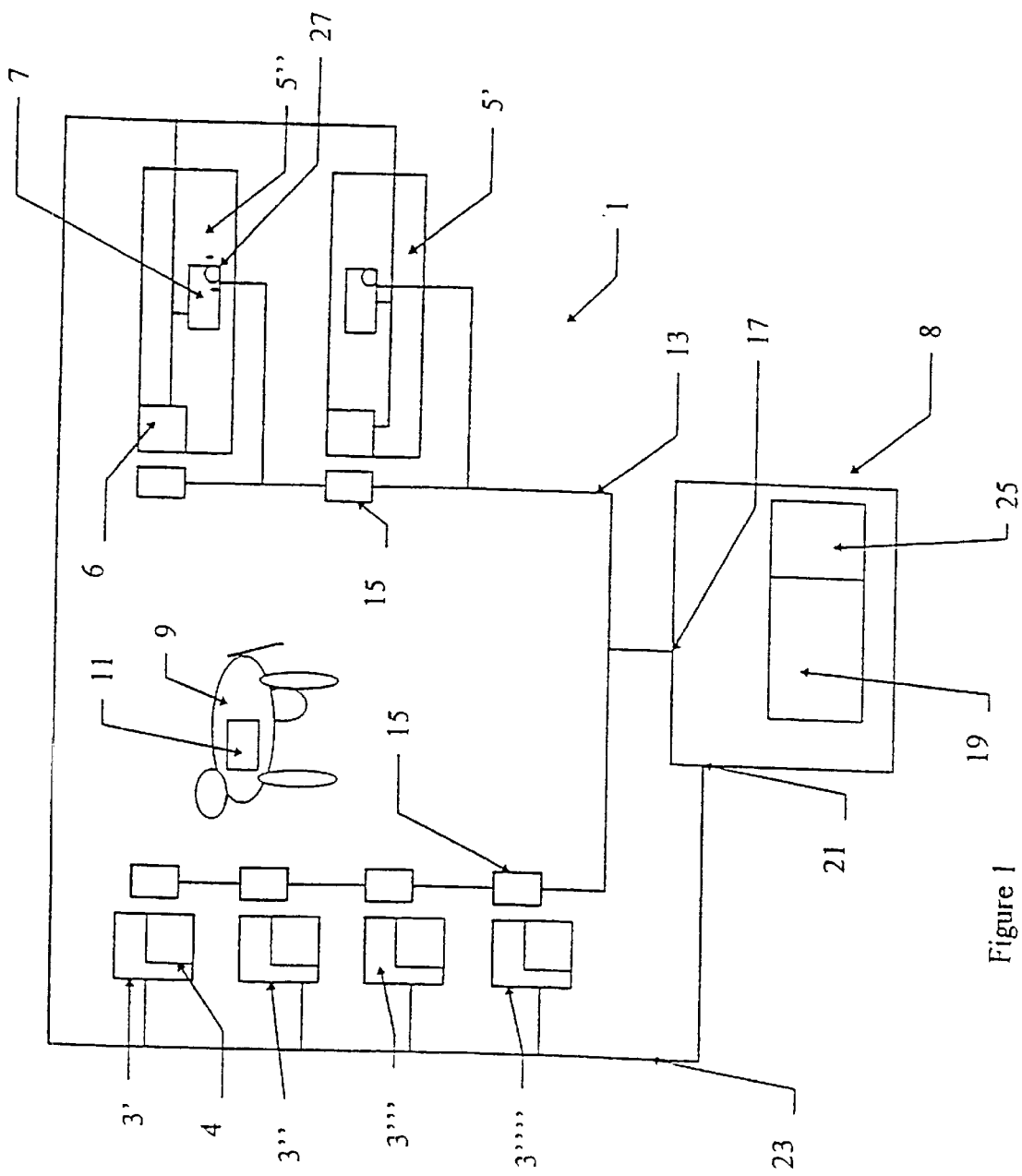

US 6,543,381 B1

METHOD AND DEVICE FOR CONTROLLING ANIMAL FEEDING WHEN MILKING DAIRY ANIMALS

TECHNICAL FIELD OF THE INVENTION

The present invention relates to a method and a device for milking dairy animals.

DESCRIPTION OF RELATED ART

Continuous efforts are being made in order to reduce the costs of producing milk. One way of doing this is to increase the frequency of milking from twice a day to four or more times a day as this can give a 15–20% increase in milk production. However to avoid increased labour costs the animals need to be milked automatically. One type of automatic milking system is the so-called voluntary milking system (VMS). In one such VMS system, known from U.S. Pat. No. 4,508,058 dairy animals are permitted to move freely and can eat and be milked whenever they want. In this system each animal is provided with a coded transponder. A sensing means next to each of the feeding stations provided in the VMS is actuated by the transponder and is connected to a computer which senses which individual animal is visiting the feeding station, This computer further controls the dispensing of food to each animal. This depends on how much food the individual animal is supposed to be fed each day and how much the animal has already been fed that day. Some feeding stations are combined with milking machines and if the computer detects that a certain time has passed since the individual animal in the combined feeding and milking station was last milked then the computer can activate a means for restraining the animal in the combined feeding and milking station and it can also activate an automatic milking robot. The automatic milking robot then starts milking the animal. Once the milking operation is finished the animal is release from the station.

A disadvantage with the above system is that it is not possible to ensure that the animals enter a combined feeding and milking station at the optimum time to enable the maximum milk production. This is because an animal which could be milked may choose to eat from a simple feeding station and thereby miss an opportunity to be milked at the optimum time.

SUMMARY

The object of the invention is to solve the above stated problems.

The present invention solves the above stated problems by means of a device having the features mentioned in the characterising part of claim 1. The above problems are also solved by means of a method having the features mentioned in the characterising part of claim 8.

In a method and device in accordance with the present invention, a voluntary milking system is provided with means for controlling the dispensing of feed to the individual animals so that the individual animal is directed to the appropriate type of feeding station depending on whether it needs to be milked or not. In one embodiment of the invention at a predetermined time, corresponding, for example, to an optimum time to milk the animal after the last time that an individual animal has been milked, or to a time shortly before the optimum time, or to an average time between milkings, the computer commands all the simple feeding stations to stop supplying feed to the animal in question. The animal will then only be able to receive feed at the combined milking and feeding station. The animals soon learn that when the simple feeding stations do not dispense feed they have to go to a combined feeding and milking station. In this way the animals are encouraged to enter the combined feeding and milking stations.

In a second embodiment of the invention the combined feeding and milking stations are commanded to only dispense food to an individual animal if the actual time is after the commencement of the optimum time for milking the individual animal. In this way the animals which do are not re for milking are discouraged from staying in the combined feeding and milking stations. This leaves these stations free for use by animals which are ready for milking.

In a further embodiment of the invention the rate of feed supply in the simple feeding stations is lower than the rate of feed supply in the combined feeding and milking stations. The animals soon learn to try to eat in preference from the combined milking and feeding stations. This ensures that the combined feeding and milking stations are visited often by each animal and hence the chances are increased that an animal will be feeding in a combined feeding and milking station when the optimum time for milking occurs.

In another embodiment of the invention the computer also monitors the milling of the animal in the combined feeding and milking station and once the milking session is over it commands the combined feeding and milking station to stop supplying feed to the animal. At the same time it commands the simple feeding stations to allow feed to be dispensed to the animal. In this way the animal is encouraged to leave the combined feeding and milking station when the milking cycle is over.

The invention will be described more closely in the following by means of examples of embodiments and FIGURE.

BRIEF DESCRIPTION OF THE DRAWING

FIG. 1 is a schematic view of the main components of one embodiment of a voluntary milking system in accordance with the invention.

DETAILED DESCRIPTION OF EMBODIMENTS

FIG. 1 shows schematically one embodiment of a voluntary milking system (VMS) 1. The VMS 1 comprises a plurality of simple feeding stations 3'–3''', four of which are shown here but this number is not limiting and naturally can be increased or decreased according to the number of animals in the VMS. As is well known in the art each feeding station comprises controllable feed dispensing means 4 which can be controlled to dispense feed or to stop dispensing feed. The VMS 1 also comprises a plurality of combined feeding and milking stations 5'–5". Two combined feeding and milking stations 5'–5" are shown here but this number may be varied according to the actual requirements of the animals in the VMS. Each feeding and milking station 5'–5" also has a controllable feed dispensing means 6 and a controllable automatic milking means such as a milking robot 7. The VMS is controlled by control means 8, which normally is a computer 8. Each dairy animal 9 is provided with a transponder 11 which is individually, uniquely coded. The transponders 11 can be detected by sensors 15 provided at each feeding station 3'–3''' and at each combined feeding and milking station 5'–5". These sensors send signals via connection 13 to an input 17 of the computer 8. In this way computer 8 is provided with information about which, if any, animals 9 are in the feeding stations 3'–3''' and combined feeding and milking stations 5'–5". Computer 8 contains software 19 which controls feed dispensing means 4, 6 and milking robots 7. Control instructions are outputted from computer 8 via output 21 to connection 23. Connections 13 and 23 could be transmission cables or they could be wireless connections using, for example, infra-red transmitters and receivers or radio transmitters and receivers. The computer 8 and associated software 19 perform the following functions:

- they manage a memory means 25 such as a database 25 accessible by computer 8 which for each individual animal contains preferably information on its transponder code, the optimum amount of feed it should be fed each day, the amount of feed it has eaten in the last day or other time period of interest, the time when it was last milked, the optimum elapsed time between milkings, the average time between milkings;
- they measure the elapsed time between the actual time and the last milking for each individual animal;
- they determine for each animal when the optimum time to be milked will occur:
- they control the dispensing of food from the simple feeding stations for each individual animal in order to ensure that when the optimum time for an animal to be milked approaches then the animal can only receive food if it enters a combined feeding and milking station.

The VMS works as follows:

when an animal 9 enters a feeding station 3'–3"" then the sensor 15 associated with the station 3'–3"" sensors the unique transponder code of the animal 9. It then transmits a signal to the computer 8 that the animal is ready to be fed. The computer checks how much food the animal has eaten in the last day or other time period of interest, e.g. the last 12 hours and determines how much food the animal should be allowed to eat at the current time. The computer then checks when was the last time that the animal was milked. Using the information about the optimum time or average time between milkings for the animal which is stored in, for example, the computer database the computer determines the time for the next milking for this animal. This time is used to calculate the starting time of an optimum time window in which milking should take place. This time window could extend, for example, from one hour before the optimum time for milking onwards. If the actual time is before the start of this time window then the computer commands the feed dispensing means 4 to dispense a suitable amount of food to the animal 9 such that it can be expected to be hungry again when the optimum time occurs. The animal 9 then eats the food and leaves the feeding station 3'–3"" as it will soon learn that it cannot continue to be fed once the feed dispensing means 4 has stopped dispensing food.

If the actual time is after the start of this time window then it is desirable that the animal leaves the feeding station 3'–3"" and goes instead to a combined feeding and milking station 5'–5". In order to encourage the animal to do this the computer commands the feed dispensing means 4 to not dispense any food to the animal 9 in the feeding station 3'–3"". The animal will leave the feeding station 3'–3"" after a while when it realises that it will not be supplied with any food there. The animal will soon learn that if it does not receive food in a simple feeding station 3'–3"" then it must go to a combined feeding and milking station 5'–5".

When an animal 9 enters a combined feeding and milking station 5'–5" then the sensor 15 associated with the station 5'–5" sensors the unique transponder code of the animal 9. It then transmits a signal to the computer 8 that the animal is ready to be fed. The computer checks how much food the animal has eaten in the last day or other time period of interest, e.g. the last 12 hours and determines how much food the animal should be allowed to eat at the current time. The computer then checks when was the last time that the animal was milked and as described above calculates the starting time of an optimum time window in which milking should take place. If the actual time is before this time window then the computer commands the feed dispensing means 4 to not dispense any food to the animal 9 in the combined feeding and milking station 5'–5". The animal will leave the combined feeding and milking station 5'–5" after a while when it realises that it will not be supplied with any food there. The animal will soon learn that if it does not receive food in a combined feeding and milking station 5'–5" then it must go to a simple feeding station 3'–3"".

If the actual time is after the commencement of the optimum time window then it is desirable that the animal is milked. The computer therefore commands the food dispensing means 6 to start dispensing food to the animal 9. At the same time the computer orders the milking robot 7 to restrain the animal and to start milking it. As the animal 9 eats the food it is milked. The milk flow from the animal 9 is sensed by milk flow sensing means 27 of any suitable type which produce an output signal which can be received by computer 8. Once the milking cycle is completed as sensed and reported to the computer by milk flow sensing means 27 the food dispensing means 6 is ordered to stop dispensing food to the animal. Alternatively the dispensing of food can be stopped in anticipation of the end of the milking cycle, for example, when the milk flow from the animal falls below a predetermined flow rate. The animal is released from the restraining means. The animal will then soon leave the combined feeding and milking station 5'–5" as it will have learnt that it will not continue to be fed there once the milking cycle is over.

In a second embodiment of the invention the food dispensing means 4 in the simple feeding stations 3'–3"" are further controlled to dispense food at a slower rate then the food dispensing means 6 in a combined feeding and milking station 5'–5". Preferably the rate in food dispensing means 4 is slower than the average eating rate of an animal so that the animal has to occasionally wait for food to be dispensed in a simple feeding station 3'–3"". The rate in food dispensing means 6 is preferably faster then the average eating rate of an animal so that the animal does not have to wait so long for food to be dispensed in the combined feeding and milking stations. In this way the combined feeding and milking stations will tend to be used first by the animals and therefore there is a greater chance that an animal will enter a combined feeding and milking station 5'–5" during the optimum time window for milking.

What is claimed is:

1. Milking apparatus (1), for the milking of dairy animals (9), comprising:
   individual identifying means (11), intended to be worn one on each individual dairy animal (9);
   simple feeding stations (3'–3""), each provided with a food dispensing, means (4) and a sensing means (15) for sensing said individual identifying means (11);
   a combined feeding and milking station (5', 5"), provided with a food dispensing means (6), a milking means (7), and a sensing means (15) for sensing said individual identifying means (11); and
   control means (8, 19) for controlling the simple feeding stations (3'–3"") and the combined feeding and milking station (5'–5"), characterized in that said control means (8, 19) is provided with a determining means (19), which is arranged to calculate, for each individual animal (9), on the basis of at least registered feed consumption and the time of the latest milking, a time for starting the next milking, and in that the determining means (19) is arranged to control said simple feeding stations (3'–3"") to allow for each individual animal (9) dispensing of feed only before said time for next milking and to control the combined feeding and milking station (5'–5") to allow dispensing of feed only at a time after said time, in association with performing of milking.

2. Milking apparatus in accordance with claim 1, characterized in that the maximum rate of supply of feed in a simple feeding station (3'–3"") is less than the maximum rate of supply of feed in the combined feeding and milking station (5'–5").

3. Milking apparatus in accordance with claim 1, characterized in that the combined feeding and milking station (5'–5") is provided with a milk flow sensing means (27) and that said control means (8, 19) is provided with output means (21) for signalling the combined feeding and milking station (5'–5") to stop dispensing feed when the sensed milk flow from the combined feeding and milking station (5'–5") is below a predetermined value.

4. Milking apparatus in accordance with claim 1, characterized in that it comprises memory means (25) for recording when an individual animal (9) was last milked.

5. Milking apparatus in accordance with claim 1, characterized in that said time for the next milking of said individual animal (9) is calculated by the determining means (19) to be the optimum time for the next milking of said animal.

6. Milking apparatus in accordance with claim 1, characterized in that said time for the next milking of said individual animal (9) is calculated by the determining means (19) on the basis of the average time between milkings of said animal.

7. Method for the milking of dairy animals (9) in a voluntary milking system (1), where every individual animal (9) can move between simple feeding stations (3'–3"") where only feed can be dispensed, and a combined feeding and milking station (5', 5"), where feed can be dispensed, and milking can be performed and where the consumption of feed for each animal is registered, characterized in that for each animal is calculated, on the basis of at least registered feed consumption and time for the last milking, a time for the starting of the next milking, and in that before said time for the next milking dispensing of feed is allowed only in the simple feeding stations (3'–3""), and in that after said time for the next milking dispensing of feed is allowed only in the combined feeding and milking station (5', 5") in connection with performing of milking.

8. Method in accordance with claim 7, characterized in that during milking the dispensing of feed is stopped when the sensed milk flow is below a predetermined value.

9. Method in accordance with claim 7, characterized in that said time for the next milking is decided as the optimum time for said individual animal (9).

10. Method in accordance with claim 7, characterized in that said time for the next milking is decided on the basis of the average time between milkings of the individual animal (9).

11. Method in accordance with claim 7, characterized in that the dispensing of feed is made at a higher rate in a combined feeding and milking station (5', 5") than in the simple feeding station (3'–3"").

12. Method for milking of dairy animals in a voluntary milking system (1) comprising: individual identifying means (11) attachable to each individual animal (9); simple feeding stations (3'–3""), provided with food dispensing means (4) for dispensing fodder and sensing means (15) for sensing said individual identifying means (11); a combined feeding and milking station (5',5"), provided with food dispensing means (6) for dispensing fodder, milking means (7) for milking animals (9) and sensing means (15) for sensing said individual identifying means (11); and control means (8,19) for controlling the simple feeding stations (3'–3"") and the combined feeding and milking station (5',5"), characterized by the steps of: recording when an individual animal (9) was last milked; determining a time for the next milking of said individual animal (9); signalling said simple feeding stations (3'–3"") to set the maximum rate of supply of feed to be less than the maximum rate of supply of feed in the combined feeding and milking station (5';5") and/or to stop dispensing food to said individual animal (9) if the actual time is after said time for the next milking of said animal.

* * * * *